United States Patent
Jackson et al.

(10) Patent No.: US 8,504,817 B2
(45) Date of Patent: Aug. 6, 2013

(54) MECHANISM FOR ADJUSTING SYSTEM SETTINGS BASED ON DYNAMIC DISCOVERY OF POWER USAGE

(75) Inventors: Adam Jackson, Somerville, MA (US); Peter Jones, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 403 days.

(21) Appl. No.: 12/874,433

(22) Filed: Sep. 2, 2010

(65) Prior Publication Data

US 2012/0060024 A1    Mar. 8, 2012

(51) Int. Cl.
*G06F 1/24*     (2006.01)
*G06F 15/177*     (2006.01)
*G06F 13/00*     (2006.01)

(52) U.S. Cl.
USPC ................................ 713/100; 713/1; 710/104

(58) Field of Classification Search
USPC ........................................................ 713/100
See application file for complete search history.

(56) References Cited

U.S. PATENT DOCUMENTS

| | | | |
|---|---|---|---|
| 6,894,632 B1 * | 5/2005 | Robinson | 341/143 |
| 7,113,032 B2 * | 9/2006 | Botti et al. | 330/124 R |
| 7,543,091 B2 * | 6/2009 | Hamaoka et al. | 710/104 |
| 7,973,556 B1 * | 7/2011 | Noguera Serra et al. | 326/38 |
| 8,183,998 B2 * | 5/2012 | Rao et al. | 340/539.12 |
| 2010/0115259 A1 * | 5/2010 | Elsila et al. | 713/100 |

* cited by examiner

*Primary Examiner* — Suresh Suryawanshi
(74) *Attorney, Agent, or Firm* — Lowenstein Sandler LLP (57) ABSTRACT

A measurement circuit measures a first power consumption value corresponding to a first configuration of a component of a computing device and a second power consumption value corresponding to a second configuration of the component. A user interface module provides a the first power consumption value for the first configuration and the second power consumption value for the second configuration. A user selection indicating one of the first configuration and the second configuration is received and a configuration module implements the configuration indicated by the user selection in the component.

27 Claims, 4 Drawing Sheets

Fig. 4

MECHANISM FOR ADJUSTING SYSTEM SETTINGS BASED ON DYNAMIC DISCOVERY OF POWER USAGE

TECHNICAL FIELD

This disclosure relates to the field of power management in a data processing system and, in particular, to adjusting system settings based on a dynamic discovery of power usage.

BACKGROUND

Power management in a data processing system often involves techniques for reducing the consumption of power by components or subsystems in the data processing system. The data processing system may be a laptop or otherwise portable computer, such as a handheld general purpose computer or a cellular telephone. The management of power consumption in a portable device which is powered by a battery is particularly important because better power management usually results in the ability to use the portable device for a longer period of time when it is powered by one or more batteries.

A data processing system and its components and subsystems may have configurable system settings which allow a user to adjust certain performance characteristics. The manner in which these system settings are configured may affect the amount of power used by the system and/or components. While the effect on power usage of certain system settings may be intuitive to a user; for other system settings, the effect may be unknown. In particular, there is no easy way of determining how the configuration of these system settings will affect power usage and, consequently, the remaining battery life for the data processing system.

One example of a component in a data processing system is a display or monitor. The display may be, for example, a liquid crystal display (LCD) panel. Generally, an LCD panel functions by applying a current to a semiconductor substrate. Depending on the manufacturing process used, the application of the current either lets light pass through the substrate (displaying a light area on the screen) or prevents light from passing (displaying a dark area on the screen). Thus, for some displays, it may require more power to keep the display generally dark, while for others, more power is required to keep the display generally light. In conventional data processing systems, the user cannot tell how a configuration of display settings (e.g., a generally light or generally dark display theme) for the LCD will affect power usage.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to adjust system settings based on dynamic discovery of power usage. In one embodiment, a power management configuration method allows for the configuration of a computing device, or a component or subsystem thereof, which accounts for how the configuration will affect a performance value of the system. In one embodiment, the computing device is a battery powered data processing device, such as a laptop computer or mobile phone, and the performance value is the period of remaining battery life. The computing device may have a number of configurable system settings which may adjust certain performance characteristics. The system settings may be configured either by a user of the computing device or by a software program executed by a processing device of the computing device. The power consumption of the computing device is measured under multiple configurations and an estimated performance value is determined for each configuration. One of the configurations may be selected and implemented based on a software algorithm, or alternatively, the user may be presented with the various configuration options and afforded the opportunity to select a desired configuration option. The configuration options may include the performance values so that the user may make an informed selection.

Figure 1:
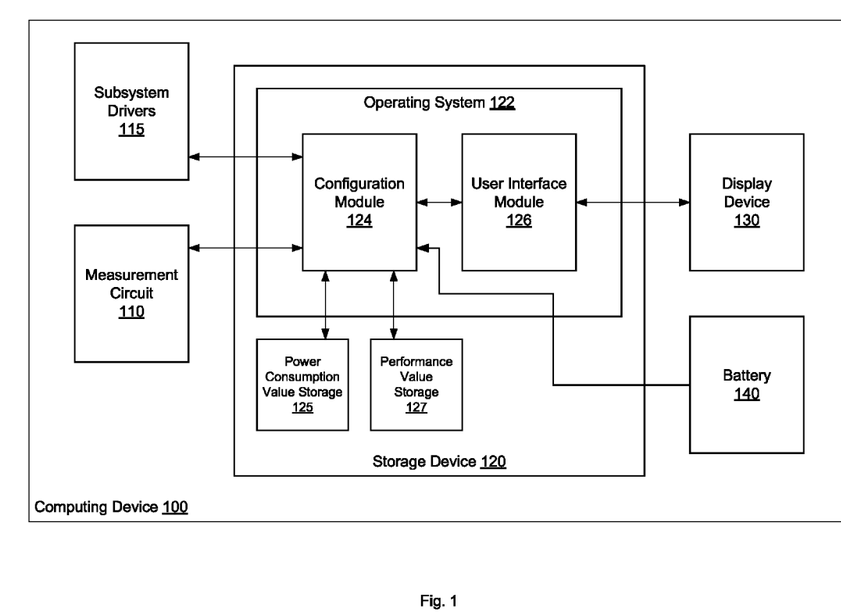
FIG. 1 is a block diagram illustrating a computing device to implement a system configuration method, according to an embodiment.

FIG. 1 is a block diagram illustrating a computing device to implement a system configuration method, according to an embodiment. Computing device 100, may be a data processing device configured to operate, at least part of the time, on battery power. Computing device 100 may be, for example, a laptop computer, a mobile phone, a tablet PC, a Personal Digital Assistant (PDA), or other data processing device. In some embodiments, computing device 100 may include a device without battery power, such as for example, a desktop personal computer. In one embodiment, computing device 100 includes measurement circuit 110, subsystem drivers 115, storage device 120 and display device 130.

In one embodiment, measurement circuit 110 may be part of an embedded controller in computing device 100. The embedded controller may perform a variety of miscellaneous functions, including charging the battery and other power management functions. Measurement circuit 110 may provide measurements of the amount of power being used by computing device 100, or by the various components thereof, under the current configuration settings. In one embodiment, where computing device does not include a built-in measurement circuit, measurement circuit 110 may be an external device connected to computing device 100 through some connection medium (e.g., universal serial bus (USB)). The external measurement circuit 110 may provide the same functions as a built-in measurement circuit (e.g., providing measurements of the current power usage).

Storage device 120 may include memory and/or mass storage media, as described below with respect to FIG. 4. In one embodiment, storage device 120 stores operating system 122. Operating system 122 stores configuration module 124 and user interface module 126. In other embodiments, configuration module 124 and user interface module 126 may be part of an application program running on top of operating system 122. Configuration module 124 may be responsible for applying a number of system configurations to one or more components of computing device 100. A component may include a subsystem (e.g., a display), a device, a driver or any other element of computing device 100. Configuration module 124 may implement a system configuration by sending instructions to subsystem drivers 115 which adjust the corresponding component accordingly. Measurement circuit 110 takes a measurement of the amount of power used with the current configuration and sends the measurement to configuration module 124. Configuration module 124 may store the measurement of power consumption for the given configuration in power consumption value storage 125. Configuration module 124 may then determine one or more system performance values based on the power consumption values. The system performance values may include, for example, a period of remaining battery life on battery 140, a period of battery charge time, or other performance values. In a system without batteries included, the performance value may include, for example, the cost of the electricity used to power computing device 100. The determined system performance values may be stored in performance value storage 127. Configuration module 124 may then repeat the above steps with one or more other system configurations and store the results accordingly.

In one embodiment, a predefined profile for a particular component may be used instead of taking a current measurement of power consumption. The profile may be created based on testing results for the specific type and/or manufacturer of the component and may include automatic settings to minimize power usage or battery charge time, or maximize remaining battery life. The predefined profile may be distributed as a software program either with or as a part of an operating system running on computing device 100, or may be remotely accessible to computing device 100 over a network service. In another embodiment, the predefined profile may be created at runtime and stored by computing device 100 for future use.

In one embodiment, configuration module 124 may be preprogrammed with a power management algorithm. For example, the algorithm may direct configuration module 124 to implement the system configuration which has the lowest amount of power consumption or which provides for the longest remaining battery life. In that case, configuration module 124 may compare the power consumption values from storage 125 or the performance values from storage 127 and select the appropriate configuration based on the algorithm. The selected configuration may be implemented by instructions sent to subsystem drivers 115.

In another embodiment, user input is employed to select the configuration for computing device 100. In that embodiment, a user interface is generated by user interface module 126, which presents a number of configuration options to a user via a display device 130. Display device 130 may include any known display technology, including but not limited to video display devices using, liquid crystal display (LCD), light emitting diode (LED) or cathode ray tube (CRT) technology. An example of the user interface provided by user interface module 126 will be discussed below with respect to FIG. 2. The user may make a selection of one of the configuration options, which factors in the performance values as well as user preferences, via an input device, such as a mouse, trackball, touchpad, keyboard, or other input device. Configuration module 124 may implement the selected configuration accordingly.

One component to which the power management techniques described herein may be applied is display device 130 of computing device 100. Display device 130 may be configurable to display graphics from programs running on computing device 100 according to a number of different themes. One example of the different themes that may be supported by display device 130 is black text on a white background or white text on a black background. In certain programs, the background color may be the predominant color shown on the display. Due to differences in manufacturing processes of displays, more power may be required to show black color on some displays while on other displays, more power is required to show white color. In order to adjust display settings based on power usage, configuration module 124 may first implement a white on black theme configuration, receive a measurement of power consumption from measurement circuit 110, and determine the period of remaining battery life with the first configuration. Configuration module 124 may then implement a black on white theme configuration, receive a measurement of power consumption from measurement circuit 110 and determine the period of remaining battery life with the second configuration. This information may be passed to user interface module 126 which generates a configuration dialog window to be displayed to the user.

Figure 2:
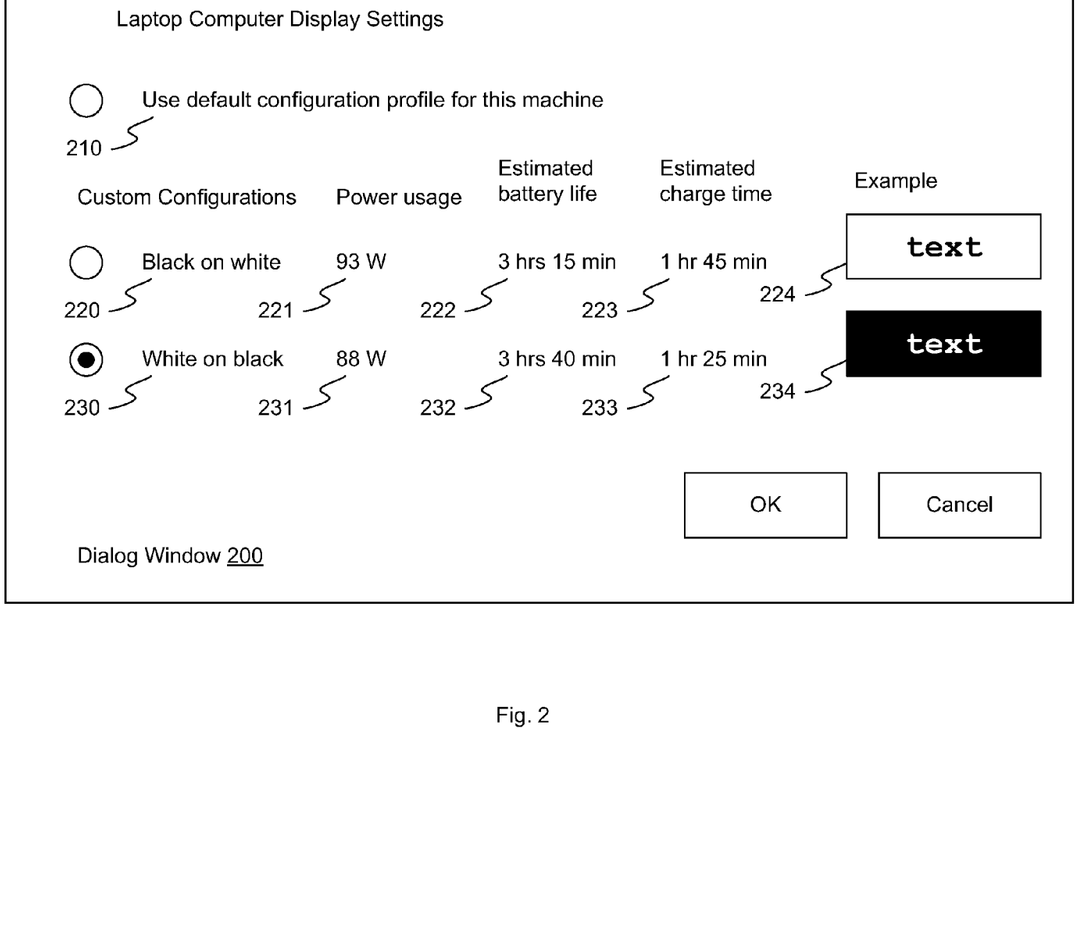
FIG. 2 is a block diagram illustrating a dialog window for a system configuration method, according to an embodiment.

FIG. 2 is a block diagram illustrating a dialog window for a system configuration method, according to an embodiment. Dialog window 200 may be displayed to the user on display device 130 automatically upon connection of display device 130 to computing device 100, at the request of a user to view system configuration options, or upon the occurrence of an event, such as for example, the remaining battery life reaching a set threshold level. In one embodiment, dialog window 200 displays a number of configuration options from which the user may make a selection. In this embodiment, dialog window 200 displays a default configuration option 210, and custom configuration options 220 and 230. Default configuration option 210 may be a predefined profile for the type of display used by computing device 100. The profile may be created based on testing results for the display type and may include automatic settings to minimize power usage or battery charge time, or maximize remaining battery life. Custom configurations 220 and 230 may represent the black on white and white on black themes discussed above, respectively. For each configuration 220 and 230, dialog window 200 may display power consumption values 221, 231, system performance values including remaining battery life 222, 232 and charge time 223, 233, and an example of the configuration theme 224, 234. The user may select from configurations 210, 220 and 230 by marking an indicator, such as a radio button or check box, corresponding to the desired configuration. The user selection may be based on the displayed power consumption and system performance values, as well as on a preference for a particular configuration.

In other embodiments, more or fewer configurations and more or fewer performance values may be displayed in dialog window 200. In addition, a dialog window corresponding to power management of another component of computing device 100 may include configurations and performance values specifically tailored to the particular component. For example, there may be other configuration options for variable-format displays, such as a cathode ray tube (CRT) display. Unlike fixed-format displays, variable-format displays typically have a consistent image quality across various displayed resolutions. Higher resolutions may be desirable because they allow the display of more information. Similarly, higher refresh rates may be desirable because they reduce visible flicker. These configurations, however, may use more power due to faster signaling on the cable, more memory bandwidth used in the graphics processing unit (GPU), etc. Since these configuration options are also dependent on user preference, they may be among the additional configuration options provided to the user to select from. The corresponding performance values may also include the cost of running a display at a high resolution and/or refresh rate.

In some embodiments, configuration options may be provided for other system components besides the display. These components may include, for example, peripherals connected to computing device 100 via universal serial bus (USB). For example, a USB powered lamp may have a direct correlation between how much current is drawn and the amount of light that is emitted. Configuration options may be presented to allow the user to control the current being drawn, and consequently, the brightness of the light, the cost of using the light, the battery drain, etc. Similar configuration options may be presented for any number of other system components not explicitly described herein.

Figure 3:
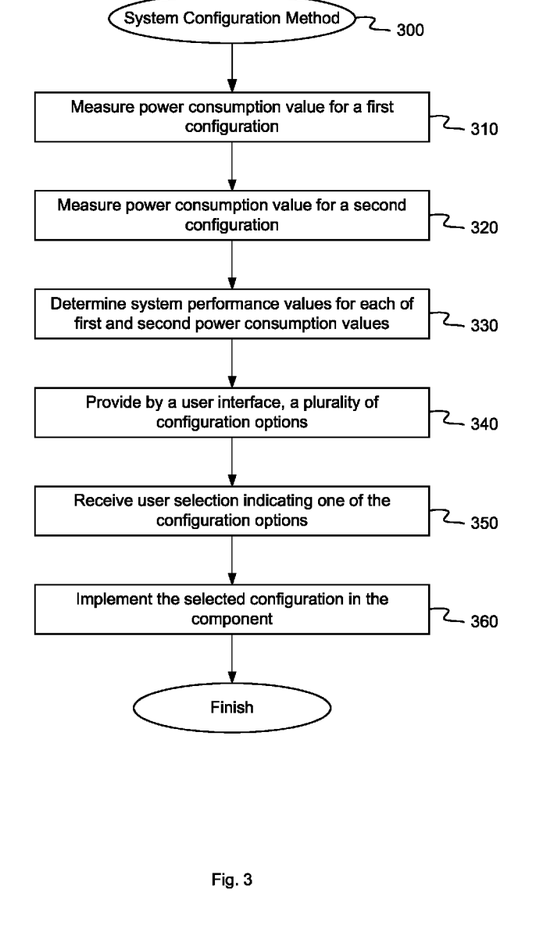
FIG. 3 is a flow diagram illustrating a system configuration method, according to an embodiment.

FIG. 3 is a flow diagram illustrating a system configuration method, according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to provide an method to adjust system settings based on dynamic discovery of power usage. In one embodiment, method 300 may be performed by computing device 100, as shown in FIG. 1.

Referring to FIG. 3, at block 310, method 300 implements a first configuration on a component and measures the power consumption for the first configuration. In the example discussed above, configuration module 124 may provide instructions to subsystem drivers 115 to cause a black on white theme to be used for display 130. Measurement circuit 110 takes a measurement of power used with the black on white theme and returns a power consumption value to configuration module 124. The power consumption value may represent an average power consumed by computing device 100 over a set period of time. In one embodiment, the time period during which the power consumption value is determined may be delayed for a period of time after the configuration is implemented to account for a settling time in the power consumption for that configuration so that a ramp up or ramp down is not factored into the average. Configuration module 124 may store the received power consumption value in power consumption value storage 125. At block 320, method 300 implements a second configuration on the component and measures the power consumption for the second configuration. In the example, the second configuration may be the white on black theme, and the measured power consumption value is similarly stored in storage 125. In one embodiment, blocks 310 and 320 are performed upon detecting an event (e.g., the initial connection of the component, or the initiation of a power management process by the user) at run time. In another embodiment, blocks 310 and 320 are performed prior to the event and may be used to create a predefined profile, as discussed above.

At block 330, method 300 determines a system performance value corresponding to each of the first power consumption value and the second power consumption value. In one embodiment, the system performance value may be a period of remaining battery life, or a period of battery charge time. Configuration module 124 may estimate the battery charge/discharge rate based on the power consumption value and calculate a time remaining based on the estimate and based on the current charge of the battery. One or more system performance values for each configuration may be stored by configuration module 124 in performance value storage 127.

At block 340, method 300 provides, by a user interface, a plurality of configuration options. User interface module 126 may receive the power consumption values and system performance values from configuration module 124 and generate the configuration options to be presented to the user. The user interface module 126 may display the configuration options on a display device 130. In one embodiment, the user interface includes dialog window 200, as shown in FIG. 2. At block 350, method 300 receives a user selection indicating one of the configuration options displayed at block 340. The user selection may be received through a user input device either integrated in or attached to computing device 100. At block 360, method 300 implements the configuration indicated by the user selection. Configuration module 125 may send a signal to subsystem drivers 115 which adjusts the settings of the component in accordance with the parameters of the configuration. In another embodiment, configuration module 125 automatically (i.e., without user input) determines which configuration option would provide the least power consumption and sends a signal to subsystem drivers 115 in order to implement that configuration option.

Figure 4:
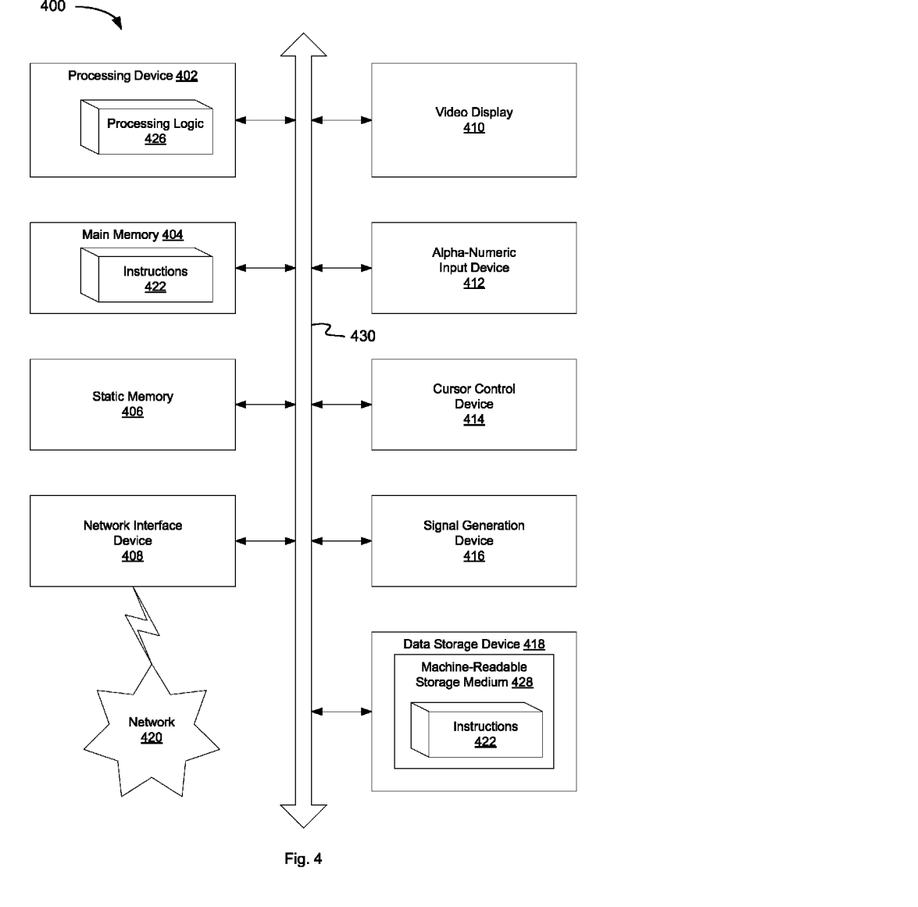
FIG. 4 is a block diagram illustrating one embodiment of a computer system, according to an embodiment.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more specialpurpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428, on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-accessible storage media. The instructions 422 may further be transmitted or received over a network 420 via the network interface device 408.

The machine-readable storage medium 428 may also be used to store instructions to perform a method 300 to configure system settings with power management considerations, and/or a software library containing methods that call the above applications. While the machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
applying a first configuration to a component in a computing device and identifying, by a processing device, a first power consumption value corresponding to the first configuration;
applying a second configuration to the component and identifying a second power consumption value corresponding to the second configuration;
determining a system performance value corresponding to each of the first power consumption value and the second power consumption value;
receiving a user selection indicating one of the first configuration or the second configuration, the user selection made in view of the corresponding system performance values; and
implementing in the component, the configuration indicated by the user selection.

2. The method of claim 1, wherein identifying the first power consumption value comprises:
implementing the first configuration of the component for a first period of time;
receiving a signal from a power management controller in the computing device, the signal comprising a current level of power consumption of the component; and
determining an average level of power consumption over the first period of time.

3. The method of claim 1, wherein identifying the second power consumption value comprises:
implementing the second configuration of the component for a second period of time;
receiving a signal from a power management controller in the computing device, the signal comprising a current level of power consumption of the component; and
determining an average level of power consumption over the second period of time.

4. The method of claim 1, wherein the system performance value comprises a period of remaining battery life for the computing system.

5. The method of claim 4, wherein determining the system performance value comprises applying an estimated battery usage rate based on the first and second power consumption values to an amount of charge currently in the battery.

6. The method of claim 1, wherein the system performance value comprises a period of battery charge time for the computing system.

7. The method of claim 6, wherein determining the system performance value comprises applying an estimated battery charge rate based on the first and second power consumption values to an amount of charge currently in the battery.

8. The method of claim 1, wherein the component of the computing device comprises a display device.

9. The method of claim 8, wherein the first configuration comprises a dark display theme, and wherein the second configuration comprises a light display theme.

10. A system comprising:
a processing device; and
a memory coupled to the processing device, the memory storing:
a configuration module executable by the processing device and the memory, wherein the configuration module to:
apply a first configuration to a component of the system and receive a first power consumption value corresponding to the first configuration; and
apply a second configuration to the component and receive a second power consumption value corresponding to the second configuration;
determine a system performance value corresponding to each of the first power consumption value and the second power consumption value; and
a user interface module executable by the processing device and the memory, wherein the user interface module to receive a user selection indicating one of the first configuration or the second configuration, the user selection made in view of the corresponding system performance values, wherein the configuration module further to implement a user selected configuration from the first configuration and the second configuration in the component.

11. The system of claim 10, further comprising:
a measurement circuit to identify the first power consumption value and the second power consumption value, wherein the measurement circuit comprises a power management controller to provide a signal comprising a current level of power consumption of the component, and wherein the configuration module determines an average level of power consumption over a first period of time for which the first configuration is implemented.

12. The system of claim 11, wherein the configuration module further determines an average level of power consumption over a second period of time for which the second configuration is implemented.

13. The system of claim 10, wherein the system performance value comprises a period of remaining battery life for the computing system.

14. The system of claim 13, wherein determining the system performance value comprises applying an estimated battery usage rate based on the first and second power consumption values to an amount of charge currently in the battery.

15. The system of claim 10, wherein the system performance value comprises a period of battery charge time for the computing system.

16. The system of claim 15, wherein determining the system performance value comprises applying an estimated battery charge rate based on the first and second power consumption values to an amount of charge currently in the battery.

17. The system of claim 10, wherein the component of the computing device comprises a display device.

18. The system of claim 17, wherein the first configuration comprises a dark display theme, and wherein the second configuration comprises a light display theme.

19. A non-transitory machine readable storage medium storing instructions which when executed cause a processing device to perform a operations comprising:
applying a first configuration to a component in a computing device and identifying, by the processing device, a first power consumption value corresponding to the first configuration;
applying a second configuration to the component and identifying a second power consumption value corresponding to the second configuration;
determining a system performance value corresponding to each of the first power consumption value and the second power consumption value;
receiving a user selection indicating one of the first configuration or the second configuration, the user selection made in view of the corresponding system performance values; and
implementing in the component, the configuration indicated by the user selection.

20. The storage medium of claim 19, wherein identifying the first power consumption value comprises:
implementing the first configuration of the component for a first period of time;
receiving a signal from a power management controller in the computing device, the signal comprising a current level of power consumption of the component; and
determining an average level of power consumption over the first period of time.

21. The storage medium of claim 19, wherein measuring the second power consumption value comprises:
implementing the second configuration of the component for a second period of time;
receiving a signal from a power management controller in the computing device, the
signal comprising a current level of power consumption of the component; and
determining an average level of power consumption over the second period of time.

22. The storage medium of claim 19, wherein the system performance value comprises a period of remaining battery life for the computing system.

23. The storage medium of claim 22, wherein determining the system performance value comprises applying an estimated battery usage rate based on the first and second power consumption values to an amount of charge currently in the battery.

24. The storage medium of claim 19, wherein the system performance value comprises a period of battery charge time for the computing system.

25. The storage medium of claim 24, wherein determining the system performance value comprises applying an estimated battery charge rate based on the first and second power consumption values to an amount of charge currently in the battery.

26. The storage medium of claim 19, wherein the component of the computing device comprises a display device.

27. The storage medium of claim 26, wherein the first configuration comprises a dark display theme, and wherein the second configuration comprises a light display theme.

* * * * *

UNITED STATES PATENT AND TRADEMARK OFFICE
CERTIFICATE OF CORRECTION

PATENT NO. : 8,504,817 B2
APPLICATION NO. : 12/874433
DATED : August 6, 2013
INVENTOR(S) : Adam Jackson and Peter Jones It is certified that error appears in the above-identified patent and that said Letters Patent is hereby corrected as shown below:

In the Claims

Claim 19, Col. 9, Line 38, "perform a operations" should be "perform operations"

Signed and Sealed this
Eighth Day of October, 2013

Teresa Stanek Rea
*Deputy Director of the United States Patent and Trademark Office*